(12) United States Patent
Tsumagari et al.

(10) Patent No.: US 7,116,897 B2
(45) Date of Patent: Oct. 3, 2006

(54) INFORMATION RECORDING APPARATUS, INFORMATION RECORDING METHOD, INFORMATION REPRODUCTION APPARATUS, INFORMATION REPRODUCTION METHOD, INFORMATION RECORDING MEDIUM, AND ELECTRONIC DISTRIBUTION SYSTEM

(75) Inventors: Yasufumi Tsumagari, Yokohama (JP); Hideo Ando, Hino (JP); Hisashi Yamada, Yokohama (JP); Hideki Mimura, Yokohama (JP); Kazuhiko Taira, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1183 days.

(21) Appl. No.: 09/942,617

(22) Filed: Aug. 31, 2001

(65) Prior Publication Data

US 2002/0051626 A1   May 2, 2002

(30) Foreign Application Priority Data

Aug. 31, 2000   (JP) .............................. 2000-264385

(51) Int. Cl.
*H04N 7/26* (2006.01)

(52) U.S. Cl. .................................................... 386/111

(58) Field of Classification Search ................ 386/111; 713/193; 370/329, 330, 395, 397, 495, 496, 370/241–253, 524, 525; 358/1.1, 1.2, 1.14–1.18, 358/400, 401
See application file for complete search history.

(56) References Cited

U.S. PATENT DOCUMENTS

| | | | | |
|---|---|---|---|---|
| 5,138,459 A * | 8/1992 | Roberts et al. .......... 348/231.6 |
| 5,488,433 A * | 1/1996 | Washino et al. ............. 348/722 |
| 5,684,918 A * | 11/1997 | Abecassis ..................... 386/83 |
| 5,721,720 A * | 2/1998 | Kikuchi et al. .......... 369/275.3 |
| 5,758,007 A * | 5/1998 | Kitamura et al. ............. 386/45 |
| 5,983,369 A * | 11/1999 | Bakoglu et al. .............. 714/46 |
| 6,018,816 A * | 1/2000 | Tateyama .................... 714/746 |
| 6,055,565 A * | 4/2000 | Inai ............................ 709/218 |
| 6,121,998 A * | 9/2000 | Voois et al. ............. 348/14.13 |
| 6,192,188 B1 * | 2/2001 | Dierke ........................ 386/95 |
| 6,195,503 B1 * | 2/2001 | Ikedo et al. ................. 386/104 |
| 6,453,071 B1 * | 9/2002 | Ito et al. ...................... 382/232 |
| 6,606,707 B1 * | 8/2003 | Hirota et al. ................ 713/172 |
| 6,674,477 B1 * | 1/2004 | Yamaguchi et al. ..... 348/387.1 |
| 6,947,485 B1 * | 9/2005 | Owen et al. ........... 375/240.16 |
| 2005/0010795 A1 * | 1/2005 | Tagawa et al. ............. 713/193 |
| 2005/0289617 A1 * | 12/2005 | Safadi et al. ................. 725/89 |

FOREIGN PATENT DOCUMENTS

JP       2000-187963        7/2000

* cited by examiner

*Primary Examiner*—Thai Tran
*Assistant Examiner*—Mishawn Dunn
(74) *Attorney, Agent, or Firm*—Oblon, Spivak, McClelland, Maier & Neustadt, P.C.

(57) ABSTRACT

An information recording apparatus of this invention includes a MAIN MPU for generating manager information representing the correspondence between a compressed content and a program for expanding the content, and a disc drive section for recording the content, program, and manager information on an information recording medium.

21 Claims, 11 Drawing Sheets

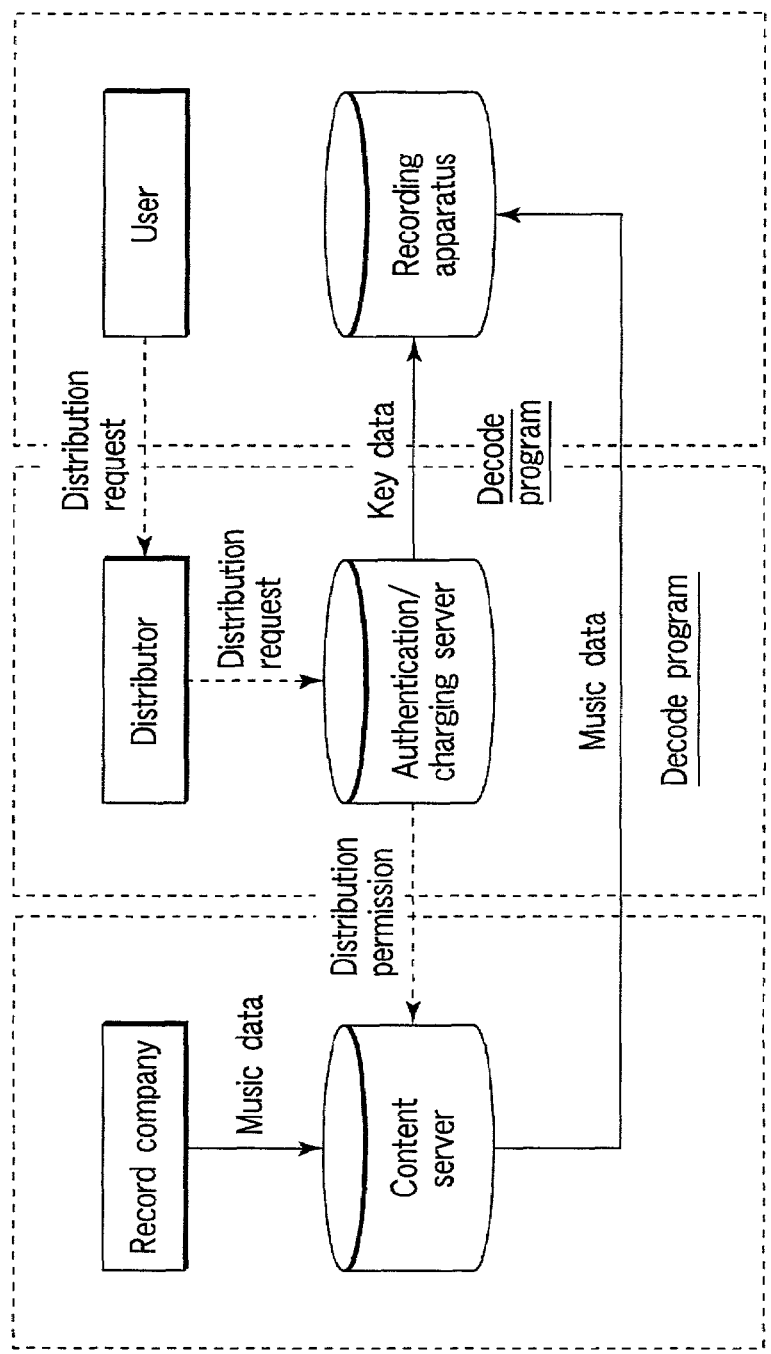
F I G. 1

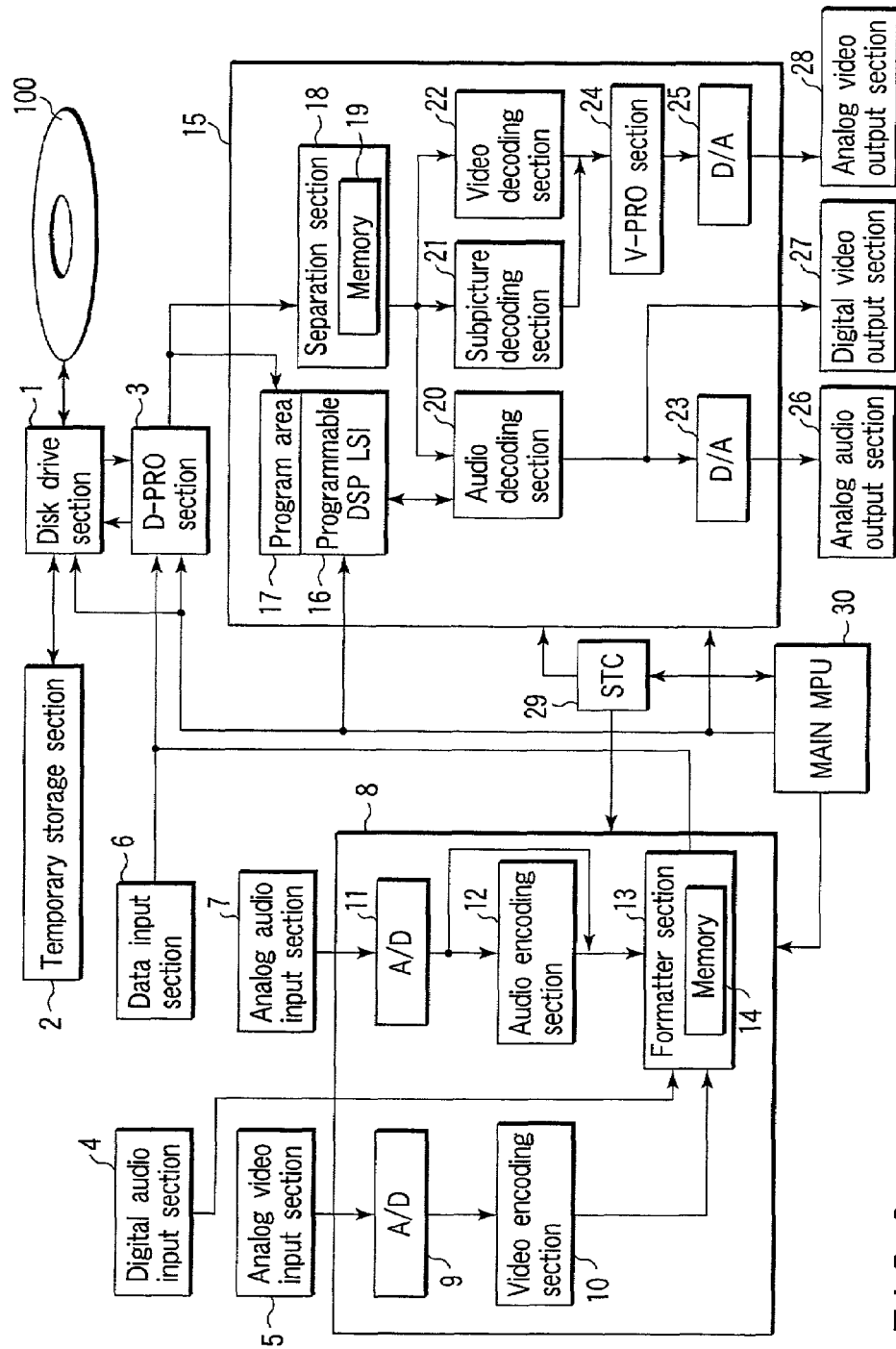
F I G. 2

```
0000 0000b : No program for decode in the disk
0000 0001b : Packed PCM audio
0000 0010b : AC-3 audio
0000 0011b : MPEG audio
0000 0100b : AAC audio
0000 0101b : MPEG layer-3 audio
0000 0110b : ATRAC3 audio
0000 0111b : WMA audio
0000 1000b : DTS audio
0000 1001b : Twin-VQ audio
0000 1010b : Q Design audio
others     : reserved for other coding mode
```

FIG. 12

```
0000 0000b : This disk has no program for decoding.
0000 0001b : This disk has the program for decoding.
others     : reserved
```

FIG. 13

INFORMATION RECORDING APPARATUS, INFORMATION RECORDING METHOD, INFORMATION REPRODUCTION APPARATUS, INFORMATION REPRODUCTION METHOD, INFORMATION RECORDING MEDIUM, AND ELECTRONIC DISTRIBUTION SYSTEM

CROSS-REFERENCE TO RELATED APPLICATIONS

This application is based upon and claims the benefit of priority from the prior Japanese Patent Application No. 2000-264385, filed Aug. 31, 2000, the entire contents of which are incorporated herein by reference.

BACKGROUND OF THE INVENTION

1. Field of the Invention

The present invention relates to an information recording method and apparatus for recording a compressed object (content) and the like on an information recording medium.

The present invention also relates to an information reproduction method and apparatus for reproducing an information recording medium on which a compressed object and the like are recorded.

The present invention also relates to an information recording medium on which a compressed object and the like are recorded.

The present invention also related to an electronic distribution system for distributing a compressed object and the like.

2. Description of the Related Art

The DVD forum issued a standard capable of recording/reproducing video information on/from an information recording medium.

Video information has a unit called a "recording unit" or "title corresponding to program unit" which divides large video contents. In the above standard, a management unit called "video object" is used for the "recording unit", and a management unit called "program" is used for the "program unit or title".

The DVD forum is currently examining an audio recording standard, i.e., a standard capable of recording/reproducing audio information highly compatible with the above video recording standard.

In the video recording standard, video data is compressed by MPEG2 and recorded, and audio data is recorded by linear PCM without any compression, or compressed by MPEG audio or AC-3 and recorded. In addition to the above audio compression schemes, various kinds of audio compression schemes exist, including AAC, MP3, ATRAC3, WMA, DTS, Twin-VQ, and Q Design. When a plurality of compression schemes are selected as the audio recording standards, an audio recording compatible recorder only need to have an encoder of at least one of the compression schemes. However, a compatible player must have decoders of all compression schemes to keep the compatibility. In addition, in supporting a new compression scheme to be developed in the future, the compatibility cannot be ensured.

BRIEF SUMMARY OF THE INVENTION

The present invention has been made in consideration of the above situation, and has as its object to ensure compatibility with various kinds of compression schemes.

In order to solve the above problem and achieve the above object, an information recording apparatus, information recording method, information reproduction apparatus, information reproduction method, information recording medium, and electronic distribution system according to the present invention have the following arrangements.

(1) An information recording apparatus of the present invention comprises generation means for generating manager information representing a correspondence between a compressed content and a program for expanding the content, and recording means for recording the content, program, and manager information on an information recording medium.

(2) An information recording method of the present invention comprises the steps of generating manager information representing a correspondence between a compressed content and a program for expanding the content, and recording the content, program, and manager information on an information recording medium.

(3) An information reproduction apparatus of the present invention comprises read means for reading out, from an information recording medium, manager information representing a correspondence between a compressed content and a program for expanding the content and reading out the content and program on the basis of the manager information, and reproduction means for expanding and reproducing the content on the basis of the program read by the read means.

(4) An information reproduction method of the present invention comprises the steps of reading out, from an information recording medium, manager information representing a correspondence between a compressed content and a program for expanding the content, reading out the content and program on the basis of the manager information, and expanding and reproducing the content on the basis of the readout program.

(5) An information recording medium of the present invention comprises a content recording area in which a compressed content is recorded, a program recording area in which a plurality of programs corresponding to a plurality of compression schemes are recorded together, each of the programs expanding the compressed content, and a manager information recording area in which the manager information representing a correspondence between the compressed content and the program for expanding the content is recorded.

(6) An electronic distribution system of the present invention simultaneously distributes a compressed content and a program for expanding the content.

Additional objects and advantages of the present invention will be set forth in the description which follows, and in part will be obvious from the description, or may be learned by practice of the present invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention.

FIG. 1 is a view showing an electronic music distribution (EMD) system used by a record company and the like;

FIG. 2 is a block diagram showing the schematic arrangement of an information recording/reproduction apparatus according to the present invention;

FIG. 12 is a view showing a compression scheme code list; and

FIG. 13 is a view showing the data structure of a DEC_PG in A_ATR.

DETAILED DESCRIPTION OF THE INVENTION

Figure 3:
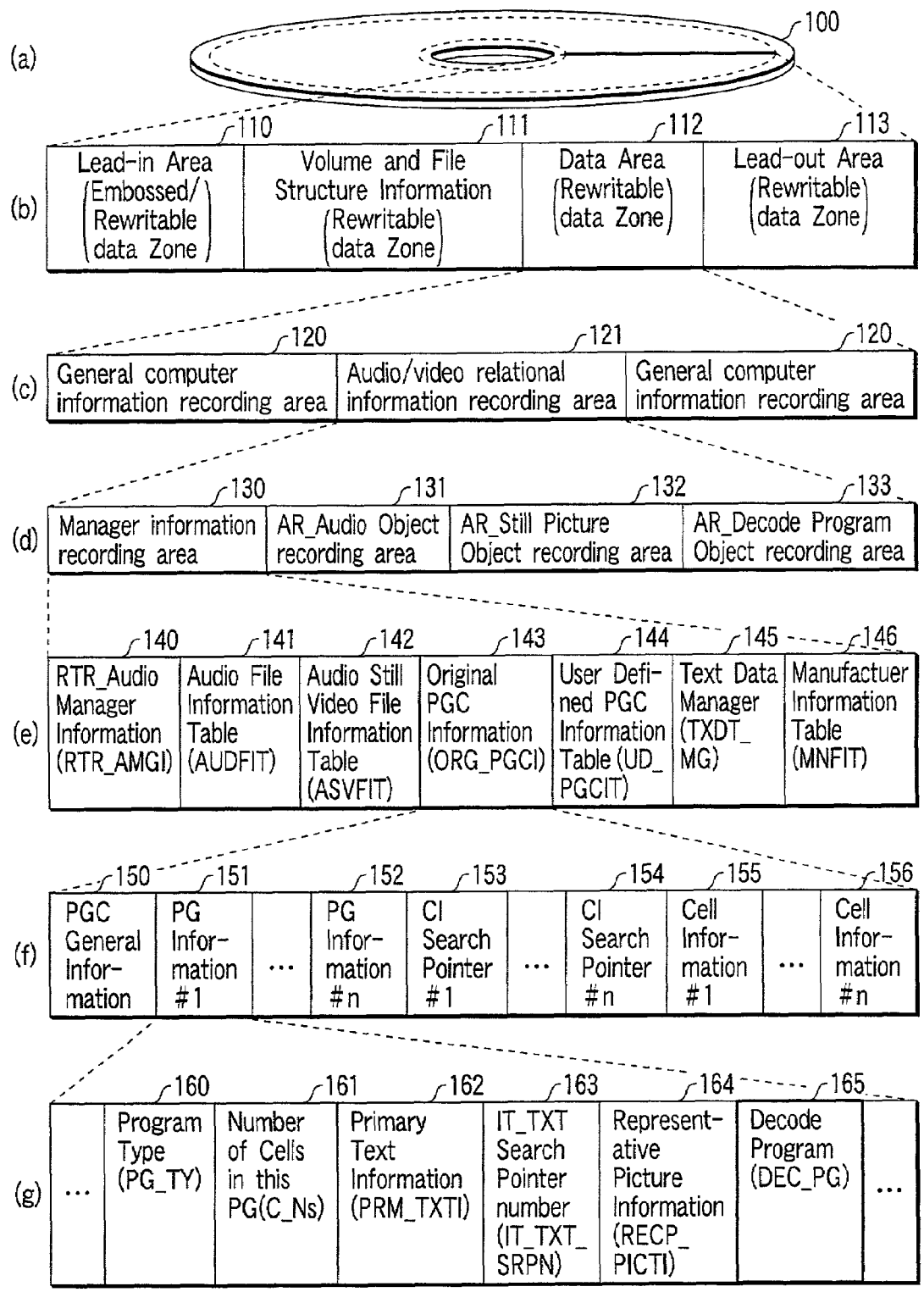
FIG. 3 is a view showing the data structure of an information recording medium according to the present invention and the recording position (first example) of manager information representing the correspondence between a compressed audio object and a decode program.

The embodiment of the present invention will be described below with reference to the accompanying drawing.

FIG. 1 is a view showing an electronic music distribution (EMD) system used by a record company and the like.

A user requests an electronic music sale site operated by a content distributor or the like to distribute a content. An authentication/charging server receives the distribution request from the distributor, charges the user for distribution, and sends a distribution permission to a content server. The user receives a decryption key from the authentication/charging server and an encrypted content from the content server. The user also acquires a program for decoding the compressed content from either server. The user decrypts the content using the acquired key and decodes the compressed content using the acquired program. With this processing, the user can reproduce the content even when he/she does not know information related to the compression form of the transmitted content as all.

FIG. 2 is a block diagram showing the schematic arrangement of an information recording/reproduction apparatus according to the present invention.

The information recording/reproduction apparatus shown in FIG. 2 records data on an information recording medium (DVD) 100 or reproduces data recorded on the information recording medium 100. As shown in FIG. 2, the information recording/reproduction apparatus comprises a disc drive section 1, temporary storage section 2, D-PRO section 3, digital audio input section 4, analog video input section 5, data input section 6, analog audio input section 7, recording section 8, reproduction section 15, analog audio output section 26, digital audio output section 27, analog video output section 28, STC section 29, and MAIN MPU section 30.

The recording section 8 has an A/D conversion section 9, video encoding section 10, A/D conversion section 11, audio encoding section 12, and formatter section 13. The formatter section 13 has a memory 14.

The reproduction section 15 has a programmable DSP LSI 16, separation section 18, audio decoding section 20, sub-picture decoding section 21, video decoding section 22, D/A conversion section 23, V-PRO section 24, and D/A conversion section 25. The programmable DSP LSI 16 has a program area 17. The separation section 18 has a memory 19.

A video object input from the analog video input section 5 is A/D-converted by the A/D conversion section 9, compressed by the video encoding section 10, and formatted into the DVD standard by the formatter section 13. On the other hand, an audio object input from the analog audio input section 7 is A/D-converted by the A/D conversion section 11, compressed by the audio encoding section 12 (or keeps the format at the time of input without being compressed), and formatted into the DVD standard by the formatter section 13. The objects formatted into the DVD standard are recorded on the information recording medium 100 through the disc drive section 1 in accordance with the standard.

An audio object input from the digital audio input section 4 is formatted into the DVD standard by the formatter section 13 while keeping the form at the time of input, and recorded on the information recording medium 100 through the disc drive section 1 in accordance with the standard.

Simultaneously, manager information related to these objects is generated in the MAIN MPU section 30 and recorded on the information recording medium 100 through the disc drive section 1 in accordance with the standard.

A decode program input from the data input section 6 is recorded on the information recording medium 100 through the disc drive section 1 in accordance with the standard together with the manager information generated in the MAIN MPU section 30, which represents the correspondence between the compressed objects and the decode program.

Figure 4:
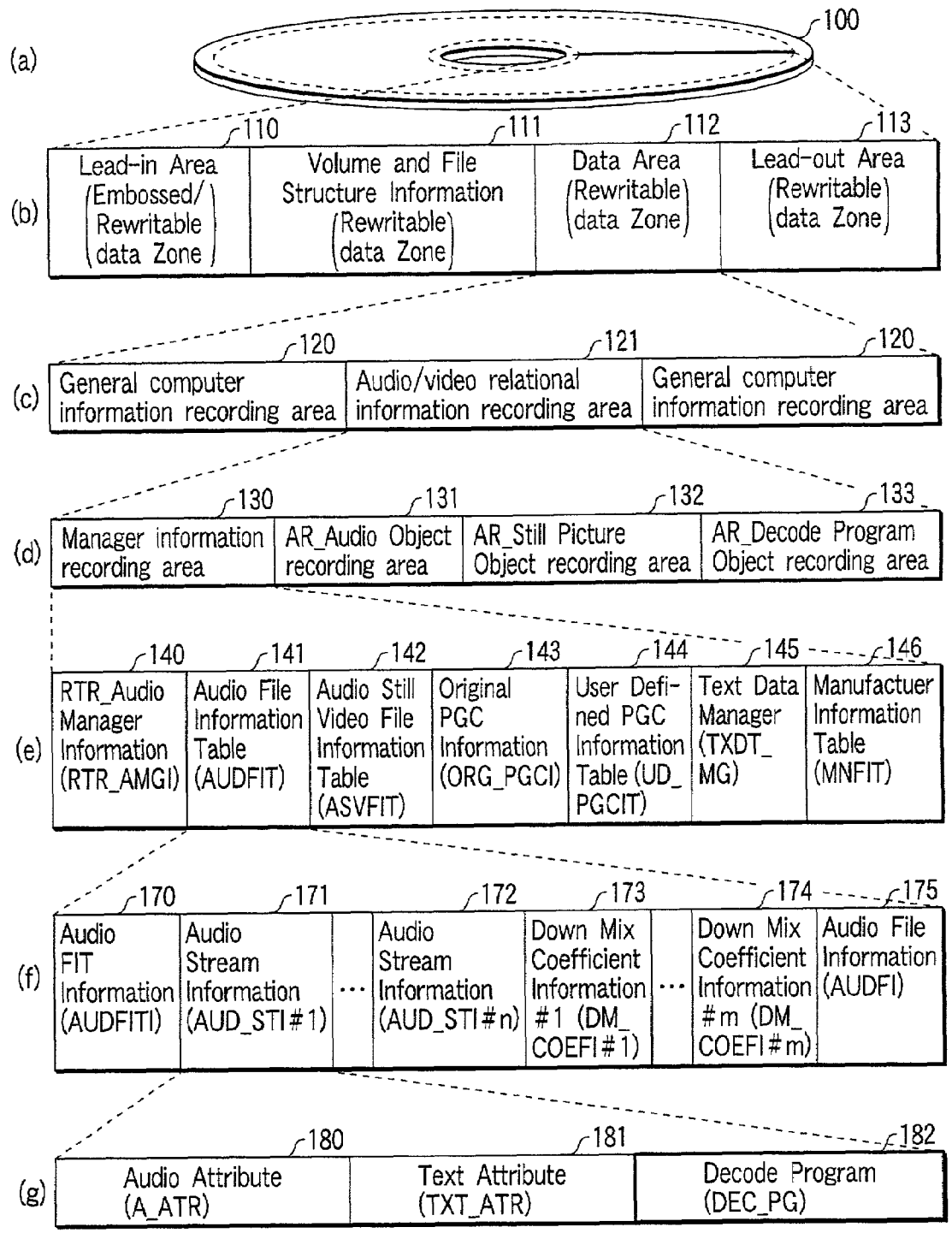
FIG. 4 is a view showing the data structure of the information recording medium according to the present invention and the recording position (second example) of manager information representing the correspondence between a compressed audio object and a decode program.
Figure 5:
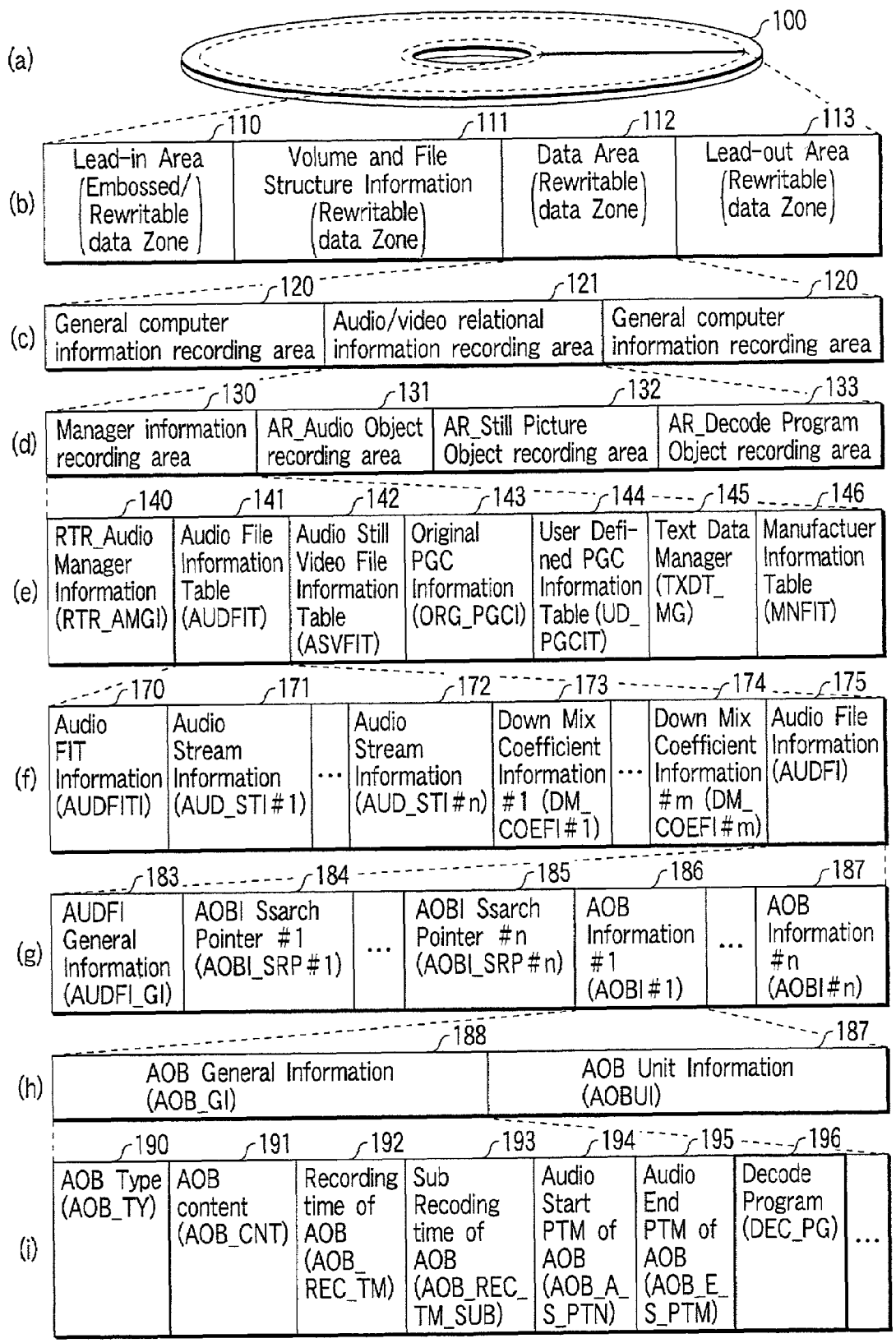
FIG. 5 is a view showing the data structure of the information recording medium according to the present invention and the recording position (third example) of manager information representing the correspondence between a compressed audio object and a decode program.

The recording position of the manager information representing the correspondence between the compressed audio object and the decode program will be described next with reference to FIGS. 3 to 5. The manager information representing the correspondence between the compressed audio object and the decode program is recorded in a manager information recording area 130 shown in FIGS. 3 to 5. More specifically, there are three examples of the recording position. FIGS. 3 to 5 show the three examples.

FIG. 3 is a view showing the data structure of the information recording medium according to the present invention and the recording position (first example) of the manager information representing the correspondence between the compressed audio object and the decode program.

The format is designed to allow both a general computer information recording area 120 and an audio/video relational information recording area 121 to exist in a data area 112, where the user can record information, in the rewritable disc-like information recording medium 100. In this embodiment, an audio content (audio object) can be reproduced, and simultaneously, a still picture can be displayed. An audio or video content is called an object. An audio content is recorded in an AR audio object recording area 131, and a video object is recorded in an AR still picture object recording area 132. If the recorded audio content is a compressed object, a decode program for decoding the object is recorded in an AR decode program object recording area 133. The contents, attribute information, and control information for display of these pieces of object information (content information) are recorded in the manager information recording area 130 together.

The information representing the correspondence between the compressed audio object and the decode program for decoding the object is also recorded in the manager information recording area 130. FIG. 12 is a view showing a code list that indicates the compression schemes of compressed audio objects. Each of "0000 0001b" to "1111 1111b" represents that a decode program for a compression scheme shown in FIG. 12 is recorded on the information recording medium, and "0000 0000b" represents that a decode program corresponding to the compression scheme is not present on the information recording medium or no decode program is required to decode the audio object. Each of these codes is stored in a decode program (DEC_PG) 165 of a PGI 151 representing each information of a program (especially a track is represented by the audio recording standard) in an ORG_PGCI 143, so that the compressed audio object can be decoded using different decode programs for the respective programs. The PGI 151 can be regarded as an area where information related to a program based on an audio object (content) is recorded.

FIG. 4 is a view showing the data structure of the information recording medium according to the present invention and the recording position of manager information (second example) representing the correspondence between the compressed audio object and the decode program.

The correspondence is stored in a decode program (DEC_PG) 182 of an AUD_STI 171 in an AUDFIT 141, which manages information of a plurality of audio objects with the same attribute. The codes shown in FIG. 12 are described in an A_ATR 180 of the AUD_STI 171 so as to indicate the compression scheme of the audio object. Data as shown in FIG. 13 are described in a DEC_PG 181. Referring to FIG. 13, "0000 0000b" represents that a decode program corresponding to the compression scheme indicated by the A_ATR 180 is not recorded on the information recording medium, and "0000 0000b" represents that the decode program corresponding to the compression scheme indicated by the A_ATR 180 is recorded on the information recording medium. With this format, the correspondence between the types of the compression scheme of the audio object recorded on the information recording medium and the presence of the decode program corresponding to the compression scheme can be uniquely defined. The AUD-_STI 171 can be regarded as an area where information related to the recording scheme of an audio object (content) is recorded.

FIG. 5 is a view showing the data structure of the information recording medium according to the present invention and the recording position (third example) of manager information representing the correspondence between the compressed audio object and the decode program.

The correspondence is stored in a decode program (DEC_PG) 196 of an AOB_GI 188 in an AOBI 186 in an AUDFI 175 of the AUDFIT 141, which manages information of each audio object. The codes indicating the compression schemes of compressed audio objects shown in FIG. 12 are described here. Each of "0000 0001b" to "1111 1111b" represents that a decode program for a compression scheme shown in the table is recorded on the information recording medium, and "0000 0000b" represents that a decode program corresponding to the compression scheme is not present on the information recording medium or no decode program is required to decode the audio object. With this format, the presence of a corresponding decode program can be defined for each audio object. In the AOB_GI 188, general information of the audio object (content) is recorded.

Figure 6:
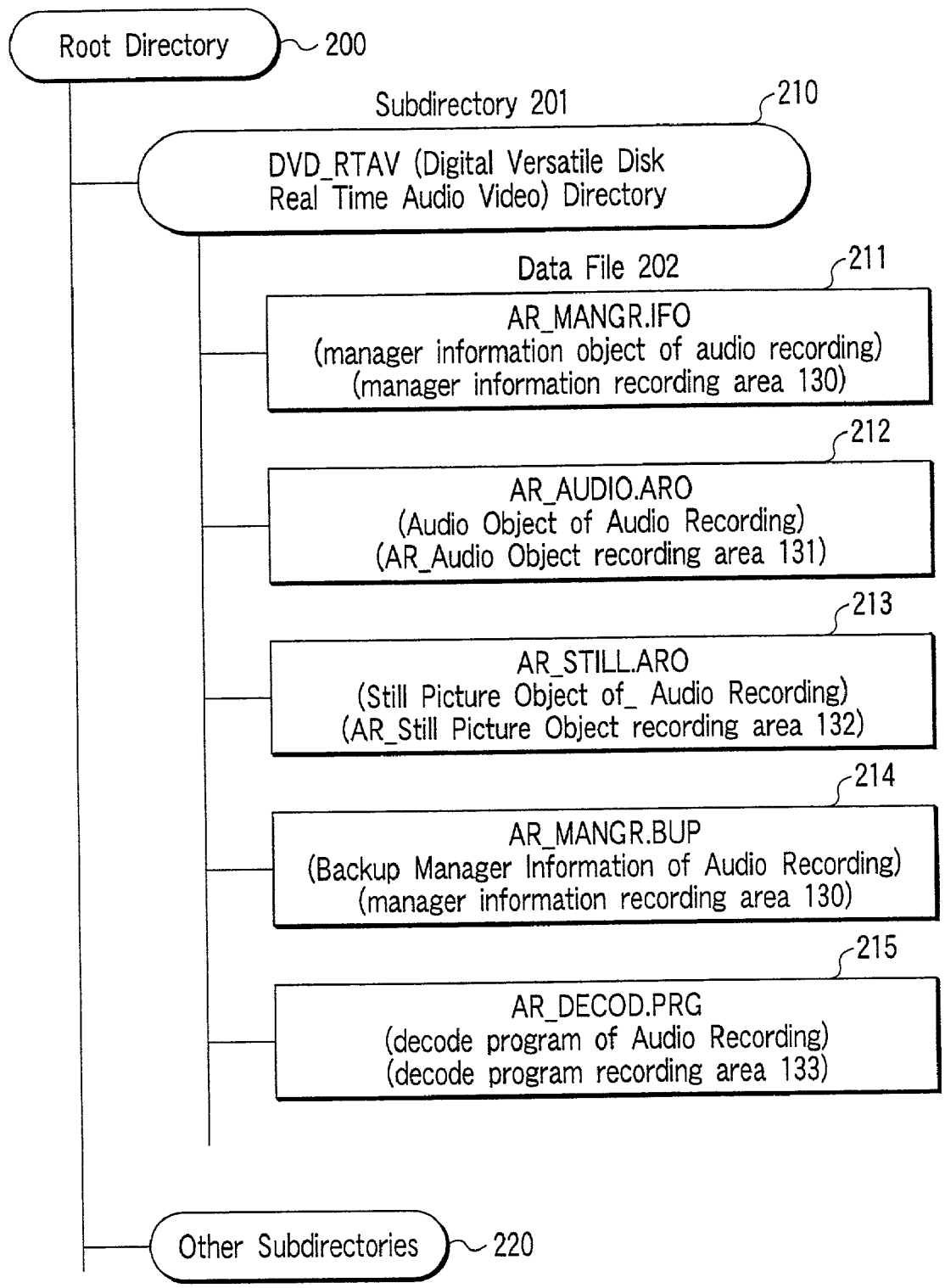
FIG. 6 is a view showing the file structure of the information recording medium according to the present invention and an example in which a plurality of decode programs are managed by one file.

Each object (content) is recorded in an independent file in accordance with the contents of the object. That is, as shown in FIG. 6, all audio contents (audio objects) are recorded in an AR_AUDIO.ARO 212 together, and all still pictures are recorded in an AR_STILL.ARO 213 together. A plurality of decode programs for decoding compressed audio objects are recorded in an AR_DECOD.PRG 215. Pieces of information in the manager information recording area 130, which systematically manage the object files, are recorded in an AR_MANGR.IFO 211 and its backup file, i.e., an AR_MANGR.BUP 214.

Figure 10:
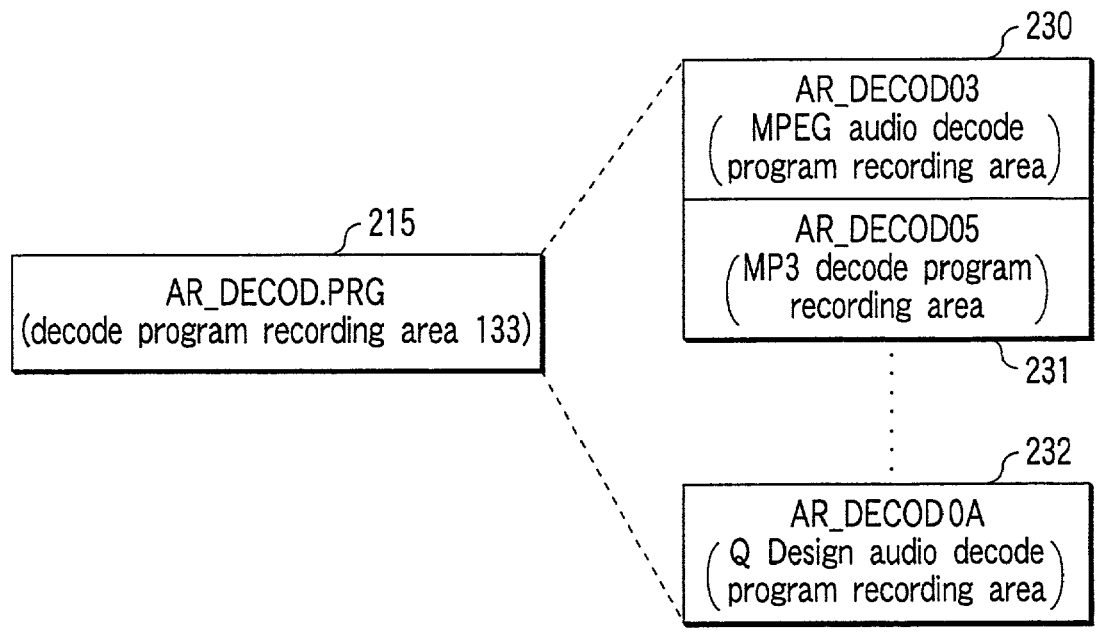
FIG. 10 is a view showing the data structure of a decode program recording area.

For example, a plurality of decode programs (230, 231, and 232) as shown in FIG. 10 are recorded in the AR_DECOD.PRG 215 together. In this case, the decode programs (DEC_PG) 165, 182, and 196 in the manager information recording area 130 must have information representing the presence of the decode programs and also indicate the areas where the decode programs are recorded.

Figure 11:
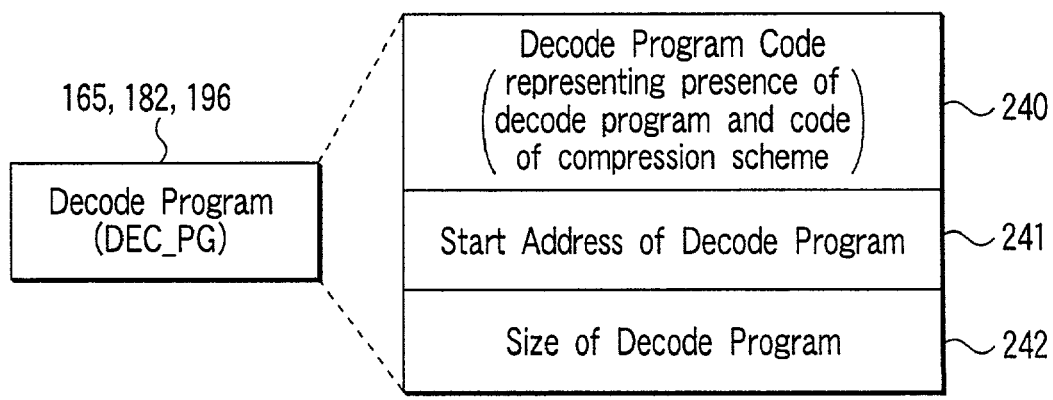
FIG. 11 is a view showing the data structure of decode programs (DEC_PG)

FIG. 11 is a view showing the data structure of the decode programs (DEC_PG) 165, 182, and 196. Each of the decode programs (DEC_PG) 165, 182, and 196 is formed from three parts: a decode program code 240, start address of decode program 241, and size of decode program 242. The decode program code 240 indicates the presence of the decode program corresponding to the compressed object using the code shown in FIG. 12 or 13, as described above. The start address of decode program 241 indicates the decode program start position as the relative number of bytes from the start position of the AR_DECOD.PRG 215. The size of decode program 242 indicates the size of the decode program as the number of bytes.

Figure 7:
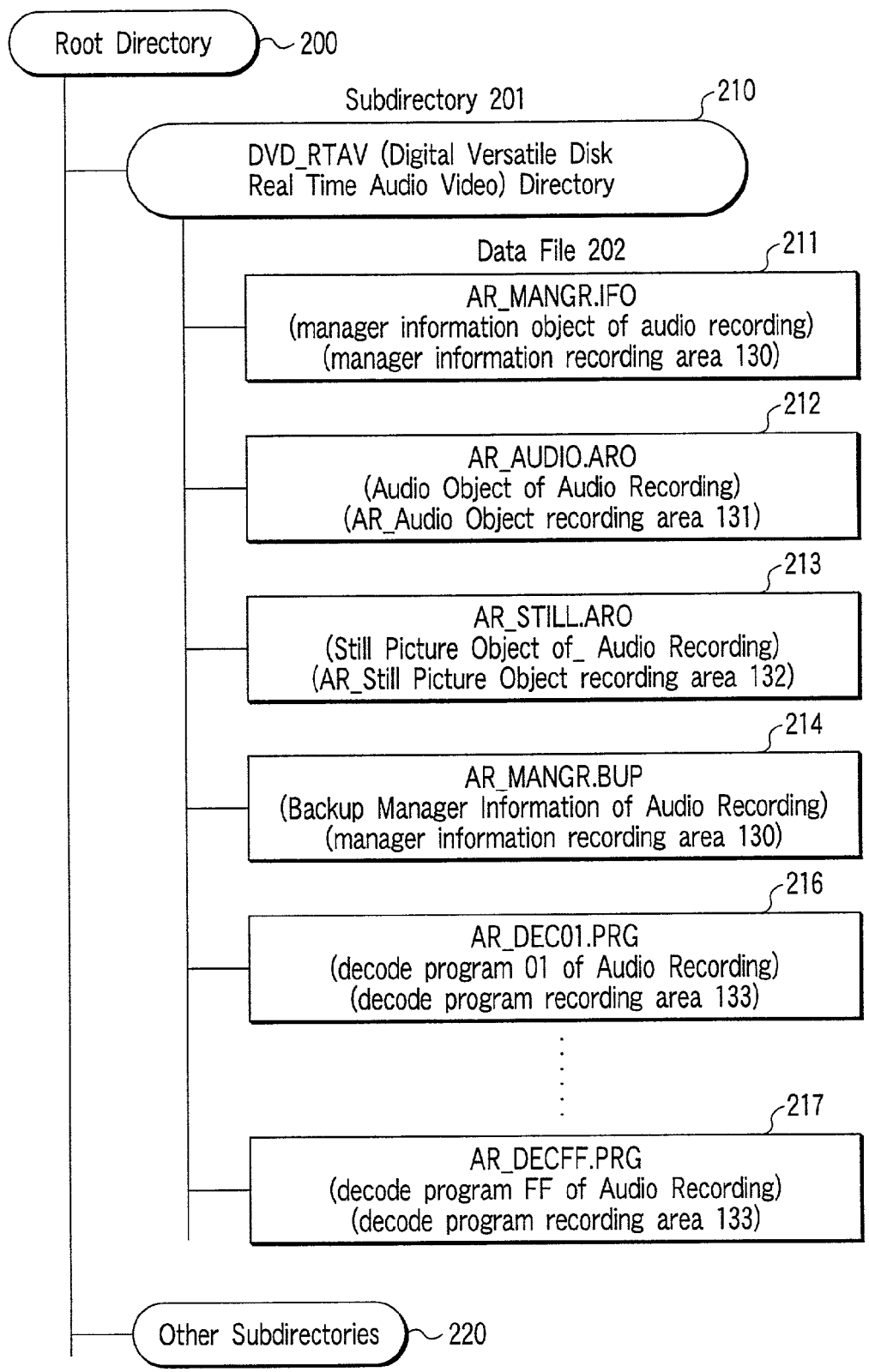
FIG. 7 is a view showing the file structure of the information recording medium according to the present invention and an example in which a plurality of decode programs are managed by a plurality of files, respectively.

FIG. 7 is a view showing another data structure for recording decode programs. The decode programs are recorded in separate files (AR_DEC01.PRG 216 to AR_DECFF.PRG 217). The names of files that record the decode programs and the code table shown in FIG. 12 are in a one-to-one correspondence. For example, when data recorded in the decode program (DEC_PG) 165, 182, or 196 or A_ATR 180 is "0000 0010b", it represents that AR_DEC03.PRG in which the decode program for AC-3 audio is recorded is present. If the data is "0000 1010b", it represents that AR_DEC0A.PRG in which the decode program for Q Design audio is recorded is present.

Figure 8:
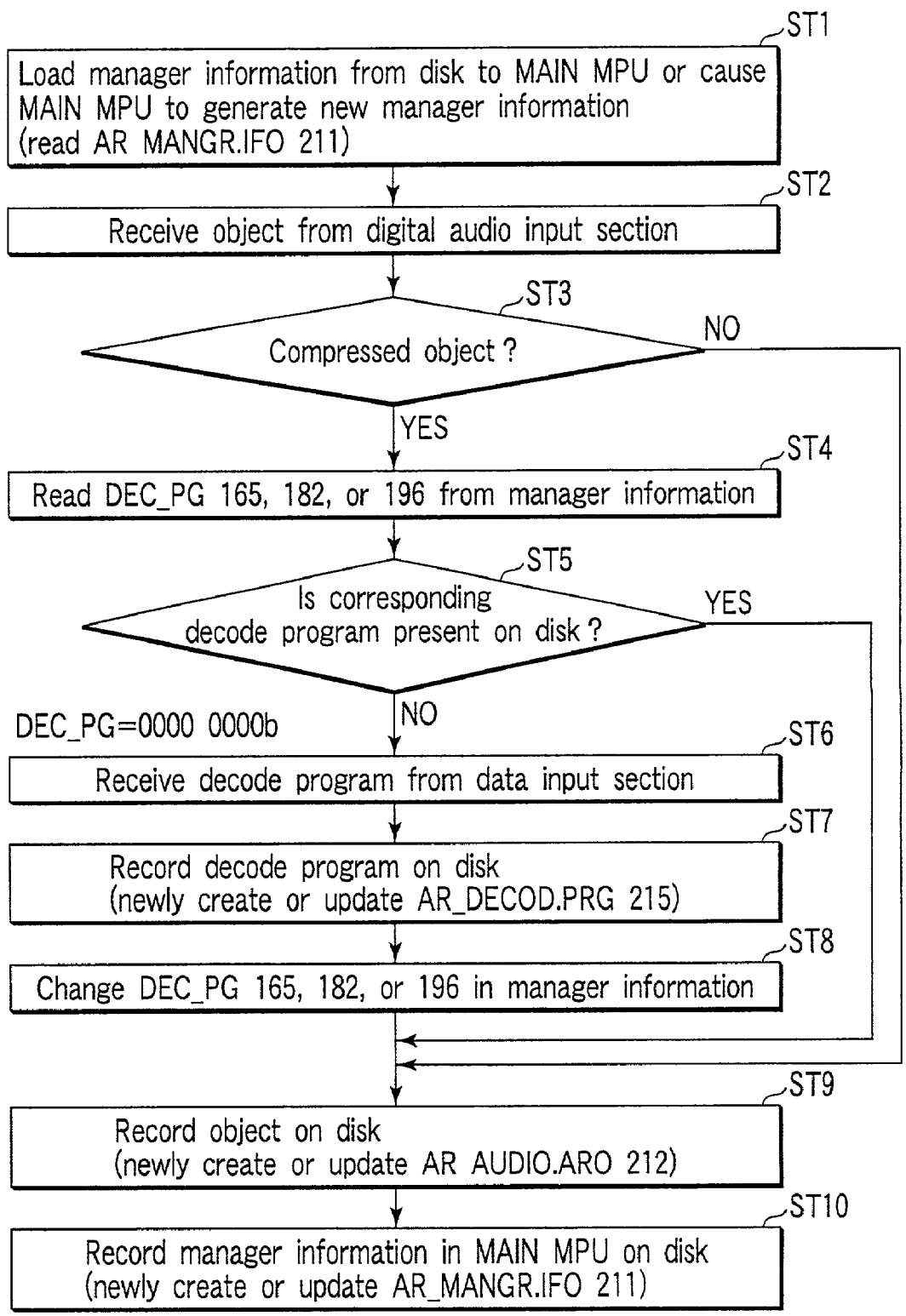
FIG. 8 is a flow chart showing processing of recording, on the information recording medium, a compressed object, a decode program for decoding the compressed object, and manager information representing the correspondence between the compressed object and the decode program.

FIG. 8 is a flow chart showing the recording operation by the information recording/reproduction apparatus.

The information recording/reproduction apparatus shown in FIG. 1 reads manager information from the AR_MANGR.IFO 211 of the information recording medium and loads the manager information to the MAIN MPU section 30 (ST1). If no manager information is present on the information recording medium, new manager information is generated in the MAIN MPU section 30 (ST1). The information recording/reproduction apparatus receives an object to be recorded from the digital audio input section 4 (ST2). The MAIN MPU section 30 checks whether the audio object is a compressed object, and if so, specifies the compression scheme (ST3). If the object is a compressed object (YES in ST3), the MAIN MPU section 30 uses the DEC_PG 165, 182, or 196 in the manager information (ST4) to check whether a decode program corresponding to the audio object to be recorded is present in the AR_DECOD.PRG 215 (or AR_DEC01.PRG 216 to AR_DECFF.PRG 217) (ST5). For example, if the audio object to be recorded is in an MPEG audio format, the MAIN MPU section 30 checks whether the AR_DEC02.PRG 216 is present on the information recording medium, or the DEC_PG 165, 182, or 196 which has a DEC_PG=0000 0010b (a code indicating AC-3 audio) is present in the manager information.

If no corresponding decode program is present on the information recording medium (NO in ST5), the decode program is received from the data input section 6 (ST6). The received decode program is recorded in the AR_DECOD.PRG 215, i.e., AR decode program object recording area 133 (ST7). Alternatively, the decode program is recorded as one file such as AR_DEC02.PRG. Simultaneously, the value of the DEC_PG 165, 182, or 196 in the manager information is changed in accordance with FIG. 12 or 13 so as to indicate that the decode program is present on the information recording medium (ST8). If the corresponding decode program is already present on the information recording medium, the decode program need not be received from the data input section 6 and recorded on the information recording medium.

The audio object received from the digital audio input section 4 is formatted into the audio recording standard and recorded in the AR_AUDIO.ARO 212 in accordance with the standard (ST9). When recording of the audio object is ended, the manager information in the MAIN MPU section 30 is changed and recorded in the AR_MANGR.IFO 211 (ST10), thus ending the series of recording operations.

Reproduction processing by the information recording/reproduction apparatus will be described next with reference to FIG. 2.

First, manager information recorded on the information recording medium 100 through the disc drive section 1 is temporarily stored in the temporary storage section (work RAM) 2 in the MAIN MPU section 30. Using the manager information in the temporary storage section 2, a video object, audio object, and the like recorded on the information recording medium are read out. If the audio object is a compressed content, a decode program corresponding to the compression scheme is loaded from the information recording medium to the program area 17 of the programmable DSP LSI 16. The audio object to be reproduced is decoded using the programmable DSP LSI 16. The video object is decoded by the video decoding section 22. These decoded objects are output from the digital audio output section 27, analog audio output section 26, or analog video output section 28 to a TV, amplifier, or speaker.

Figure 9:
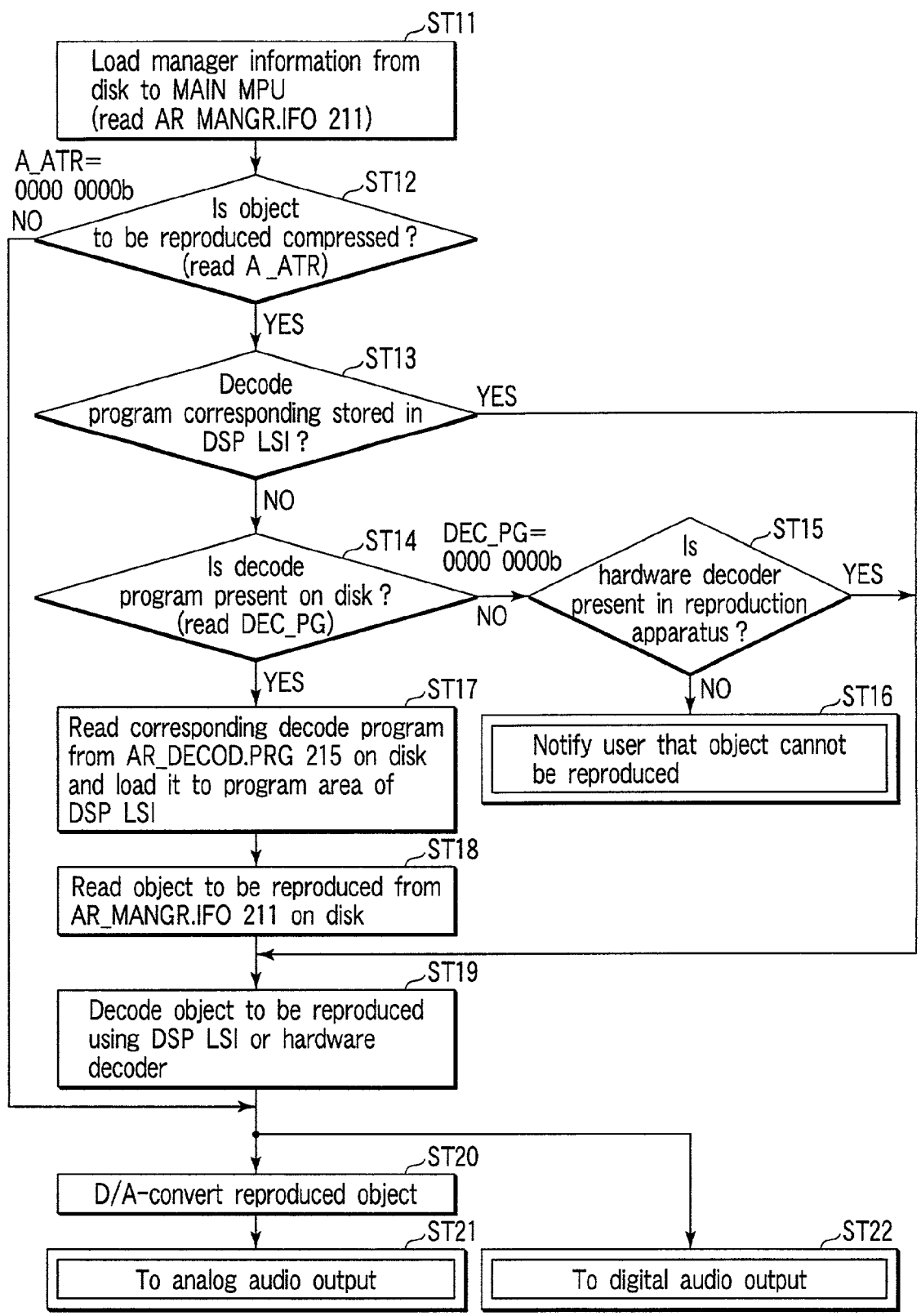
FIG. 9 is a flow chart showing processing of reproducing the information recording medium on which the compressed object, the decode program for decoding the compressed object, and the manager information representing the correspondence between the compressed object and the decode program are recorded.

FIG. 9 is a flow chart showing the reproduction operation by the information recording/reproduction apparatus.

First, the information recording/reproduction apparatus loads manager information recorded on the information recording medium for the AR_MANGR.IFO 211 to the MAIN MPU section 30 (ST11). The attribute of an audio object to be reproduced is checked using the manager information (ST12). When the audio object is an uncompressed linear PCM audio (A_ATR 180=0000 0000b) (NO in ST12), the audio object can be read out from the AR_AUDIO.ARO 212 and reproduced without any decoding operation (ST20, ST21, and ST22).

If the audio object to be reproduced is a compressed object (YES in ST12), and if a decode program for decoding this compression scheme is stored in the program area 17 of the DSP LSI 16 (YES in ST13), the compressed object read out from the AR_AUDIO.ARO 212 can be decoded using the DSP LSI 16 (ST19) to reproduce the audio object (ST20, ST21, and ST22).

If the decode program for decoding the compressed object has not been stored in the program area of the DSP LSI 16 (NO in ST13), it is checked using information in the DEC_PG 165, 182, or 196 whether the decode program is present in the AR_DECOD.PRG 215 on the information storage medium (ST14). Even if the decode program is not present (NO in ST14), if a hardware decoder corresponding to the compressed object is present in the information recording/reproduction apparatus (YES in ST15), the audio object can be reproduced using the decoder (ST19, ST20, ST21, and ST22). If neither the decode program nor the hardware decoder is present (NO in ST15), the audio object cannot be decoded (ST16).

When the decode program is present in the AR_DECOD.PRG 215 on the information recording medium (YES in ST14), i.e., when data representing the presence of the decode program is recorded in the DEC_PG 165, 182, or 196, the corresponding decode program is loaded from the AR_DECOD.PRG 215 to the program area 17 of the DSP LSI 16 (ST17). The compressed object read out from the AR_AUDIO.ARO 212 can be decoded using the DSP LSI 16 (ST18, ST19, ST21, and ST22).

The present invention will be summarized below.

(1) A provider for providing a compressed content by electronic distribution or the like transmits a decode program for decoding the compressed data together with the compressed data if the receiver has no means for decoding the compressed data.

(2) An information recording/reproduction apparatus records a decode program for decoding compressed data on an information recording medium together with the compressed data. The apparatus also records information for managing the correspondence between the compressed data and the decode program.

(3) An information recording medium has areas for recording a plurality of data compressed by different compression schemes and a plurality of different decode programs for decoding these data. The medium also has an area for recording information for managing the compressed data and decode programs.

(4) An information recording/reproduction apparatus has a programmable DSP LSI for decoding a plurality of different decode programs. First, a necessary decode program is written from the information recording medium to the program area of the DSP LSI. Then, compressed data on the information recording medium is decoded using the DSP LSI.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording apparatus comprising:
   a first input means for inputting a compressed content;
   a second input means for inputting a program for expanding the content;
   generation means for generating manager information representing a correspondence between the compressed content and the program; and
   recording means for recording the content, program, and manager information on an information recording medium,
   wherein the manager information contains
   information representing a compressing scheme of the content and presence/absence of a program corresponding to the compression scheme,
   information representing a recording start position of the program for expanding the content, and
   information representing a size of the program for expanding the content.

2. An apparatus according to claim 1, wherein the information recording medium comprises:
   a content recording area for recording the content,
   a program recording area for recording a plurality of programs corresponding to a plurality of compression schemes together, and
   a manager information recording area for recording the manager information,
   wherein said recording means records the content in the content recording area, the program in the program recording area, and the manager information in the manager information recording area.

3. An apparatus according to claim 2, wherein
   the manager information recording area includes a content relational information recording area for recording information related to the program based on the content, and
   said recording means records the manager information in the content relational information recording area included in the manager information recording area.

4. An apparatus according to claim 2, wherein
   the manager information recording area includes a content relational information recording area for recording information related to a recording scheme of the content, and
   said recording means records the manager information in the content relational information recording area included in the manager information recording area.

5. An apparatus according to claim 2, wherein
   the manager information recording area includes a content relational information recording area for recording general information of the content, and
   said recording means records the manager information in the content relational information recording area included in the manager information recording area.

6. An apparatus according to claim 1, wherein the information recording medium comprises
   a content recording area for recording the content,
   a plurality of program recording areas for separately recording a plurality of programs corresponding to a plurality of compression schemes, and
   a manager information recording area for recording the manager information,
   wherein said recording means records the content in the content recording area, the program in a predetermined program area of the plurality of program recording areas, and the manager information in the manager information recording area.

7. An apparatus according to claim 6, wherein
   the manager information recording area includes a content relational information recording area for recording information related to the program based on the content, and
   said recording means records the manager information in the content relational information recording area included in the manager information recording area.

8. An apparatus according to claim 6, wherein
   the manager information recording area includes a content relational information recording area for recording information related to a recording scheme of the content, and
   said recording means records the manager information in the content relational information recording area included in the manager information recording area.

9. An apparatus according to claim 6, wherein
   the manager information recording area includes a content relational information recording area for recording general information of the content, and
   said recording means records the manager information in the content relational information recording area included in the manager information recording area.

10. An information recording method comprising:
    inputting a compressed content and a program for expanding the content;
    generating manager information representing a correspondence between the compressed content and the program; and
    recording the content, program, and manager information on an information recording medium,
    wherein the manager information contains
    information representing a compression scheme of the content and presence/absence of a program corresponding to the compression scheme,
    information representing a recording start position of the program for expanding the content, and
    information representing a size of the program for expanding the content.

11. An information reproduction apparatus comprising:
    read means for reading out, from an information recording medium, manager information representing a correspondence between a compressed content and a program for expanding the content and reading out the content and program on the basis of the manager information; and
    reproduction means for expanding and reproducing the content on the basis of the program read by said read means,
    wherein the manager information contains
    information representing a compression scheme of the content and presence/absence of a program corresponding to the compression scheme,
    information representing a recording start position of the program for expanding the content, and
    information representing a size of the program for expanding the content.

12. An apparatus according to claim 11, wherein
the information recording medium comprises
a content recording area in which the content is recorded,
a program recording area in which a plurality of programs corresponding to a plurality of compression schemes are recorded together, and
a manager information recording area in which the manager information is recorded,
wherein said read means reads out the manager information from the manager information recording area and reads out the content from the content recording area and the program from the program recording area on the basis of the manager information, and
said reproduction means expands and reproduces the content on the basis of the program read out by said read means.

13. An apparatus according to claim 12, wherein
the manager information recording area includes a content relational information recording area for recording information related to the program based on the content,
the manager information is recorded in the content relational information recording area, and
said read means reads out the manager information from the content relational information recording area.

14. An apparatus according to claim 12, wherein
the manager information recording area includes a content relational information recording area for recording information related to a recording scheme of the content,
the manager information is recorded in the content relational information recording area, and
said read means reads out the manager information from the content relational information recording area.

15. An apparatus according to claim 12, wherein
the manager information recording area includes a content relational information recording area for recording general information of the content,
the manager information is recorded in the content relational information recording area, and
said read means reads out the manager information from the content relational information recording area.

16. An apparatus according to claim 11, wherein
the information recording medium comprises
a content recording area in which the content is recorded,
a plurality of program recording areas in which a plurality of programs corresponding to a plurality of compression schemes are separately recorded, and
a manager information recording area in which the manager information is recorded,
wherein said read means reads out the manager information from the manager information recording area and reads out the content from the content recording area and the program from a predetermined program recording area of the plurality of program recording areas on the basis of the manager information, and
said reproduction means expands and reproduces the content on the basis of the program read out by said read means.

17. An apparatus according to claim 16, wherein
the manager information recording area includes a content relational information recording area for recording information related to the program based on the content,
the manager information is recorded in the content relational information recording area, and
said read means reads out the manager information from the content relational information recording area.

18. An apparatus according to claim 16, wherein
the manager information recording area includes a content relational information recording area for recording information related to a recording scheme of the content,
the manager information is recorded in the content relational information recording area, and
said read means reads out the manager information from the content relational information recording area.

19. An apparatus according to claim 16, wherein
the manager information recording area includes a content relational information recording area for recording information related to the content,
the manager information is recorded in the content relational information recording area, and
said read means reads out the manager information from the content relational information recording area.

20. An information reproduction method comprising:
reading out, from an information recording medium, manager information representing a correspondence between a compressed content and a program for expanding the content;
reading out the content and program on the basis of the manager information; and
expanding and reproducing the content on the basis of the readout program,
wherein the manager information contains
information representing a compression scheme of the content and presence/absence of a program corresponding to the compression scheme,
information representing a recording start position of the program for expanding the content, and
information representing a size of the program for expanding the content.

21. An computer-readable medium encoded with a computer program comprising:
a content recording area in which a compressed content is recorded;
a program recording area in which a plurality of programs corresponding to a plurality of compression schemes are recorded together, each of the programs expanding the compressed content; and
a manager information recording area in which the manager information representing a correspondence between the compressed content and the program for expanding the content is recorded,
wherein the manager information contains
information representing a compression scheme of the content and presence/absence of a program corresponding to the compression scheme,
information representing a recording start position of the program for expanding the content, and
information representing a size of the program for expanding the content.

* * * * *